April 14, 1931.  J. E. WILSON ET AL  1,800,920
MAKING OF BREAD
Filed Feb. 24, 1930

Inventors:
James Elliott Wilson,
Samuel McConnell,
Campbell Brown,
By John B. Brady
Attorney Patented Apr. 14, 1931

1,800,920

UNITED STATES PATENT OFFICE

JAMES ELLIOTT WILSON, SAMUEL McCONNELL, AND CAMPBELL BROWN, OF BELFAST, IRELAND

MAKING OF BREAD

Application filed February 24, 1930, Serial No. 430,979, and in Great Britain March 18, 1929.

This invention relates to the treatment or preparation of dough for making bread, its object being to provide improved means for treating or "handling" dough between dough proving plant and the dough divider, or equivalent plant.

According to the present invention, the dough, on being discharged from proving or fermenting troughs, is passed into a hopper from which it is again passed through a chute to a second hopper wherein the dough can be held longer than in the first hopper, before being passed to the dividing machine, or equivalent. Preferably the chute from the first mentioned hopper is arranged so that it can be caused to direct the dough to more than one secondary hopper, preferably one at a time, so as to feed a number of dividing machines, or equivalent, from a common primary hopper.

The provision of a secondary hopper, or hoppers, between the primary hopper which follows and receives dough from the proving plant, is intended to regulate the discharges of the dough to the dividing machine, or equivalent. Without the secondary hoppers, it is found that the dough, especially near the end of the supply in the primary hopper tends to run out therefrom very quickly, and consequently sufficient time is not given for the proper action of the dividing machine. The introduction of the secondary hopper makes it possible to slow up the feed therefrom to the dividing machine and so regulate same. A further advantage of the secondary hopper is that the length of chute between the primary hopper and the dividing machine is shortened, and, further, the hoppers are more readily cleaned than would be a long chute. The arrangement hereinbefore described, is particularly suitable for dough handling plants in which the proving plant is arranged on one floor and the dividing or equivalent plant on the floor below.

The invention is illustrated, by way of example, in the accompanying drawings, which show apparatus adapted for serving two secondary hoppers from a common primary hopper.

Referring to the drawings:—

Figure 1:
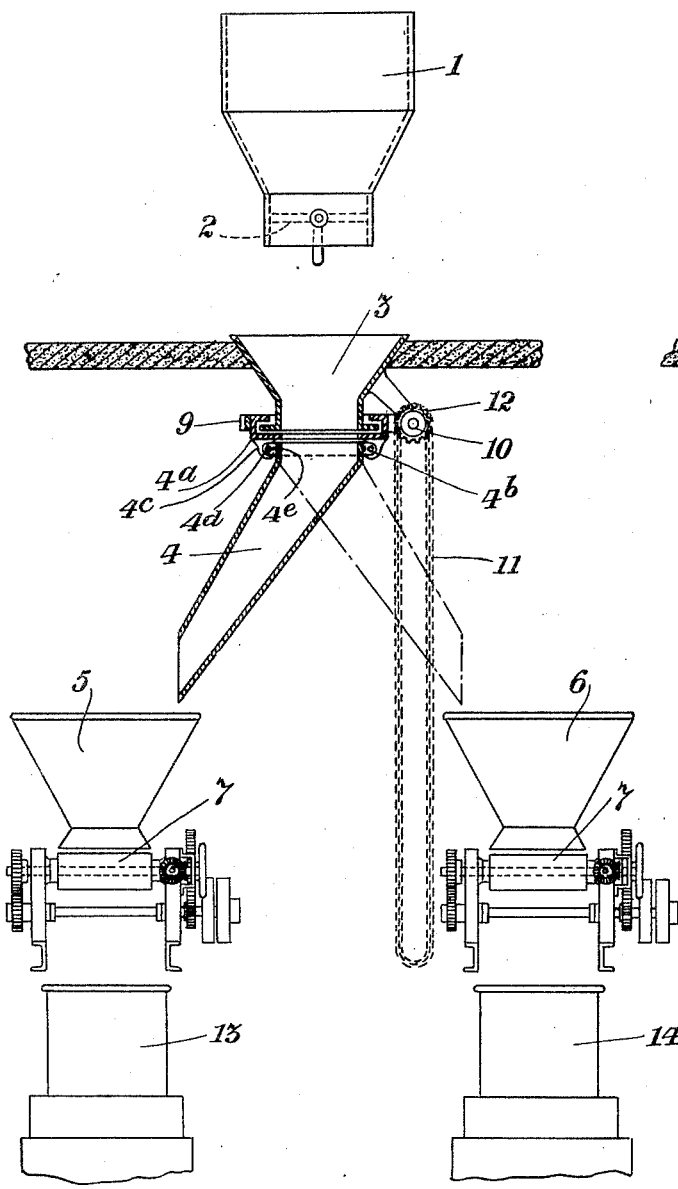
Fig. 1 is a part sectional elevation showing the apparatus in accordance with the invention.
Figure 2:
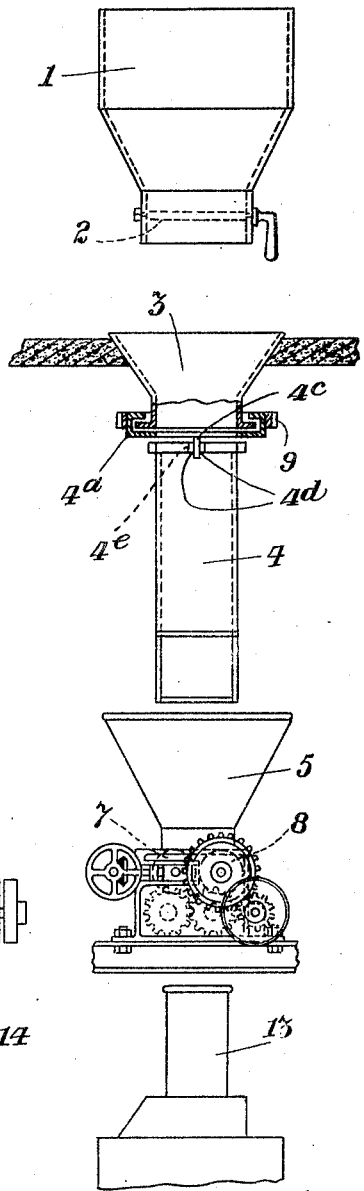
Fig. 2 is a part sectional elevation of the apparatus, taken at right angles to the view shown at Fig. 1.

Dough from the dough proving plant, not shown, is delivered into one or more primary hoppers such as 1, and is discharged therefrom through a butterfly valve, or equivalent, 2 at the bottom of the hopper 1, into a funnel 3 leading to a chute 4 which guides the dough and allows it to slide into either of two secondary hoppers 5 and 6. Each of the hoppers 5 and 6 has, below a central discharge opening in the bottom thereof, a pair of rollers 7 and 8, one of which, namely the roller 7, is adjustably mounted to give necessary adjustments of the distance between the rollers at the nip for the purpose of "braking" and regulating discharge of the dough from the rollers. This action has the further advantage of ensuring the delivery of the dough from the secondary hopper in a better condition for dividing and weighing.

The chute 4 is made so that it can be turned from the position shown in full lines in Fig. 1, to the position shown in dotted lines, in order that the chute can serve either of the two secondary hoppers 5 and 6. This is usually done alternately, and convenient operating gear is shown, comprising a worm wheel 9 mounted on the top 4a of the turntable chute 4, the worm wheel 9 being engaged by a worm 10 driven by a hand chain 11 and chain wheel 12. The hopper 4 is preferably connected with the top 4a by a hinge connection at 4b so that the portion of the chute below the hinge can be turned about the hinge, for the purpose of giving access to the funnel 3, and also to the top of the chute 4 for cleaning purposes. At the side opposite to the hinge 4b, the top 4a of the chute is provided with an apertured lug 4c, which depends between a pair of apertured lugs 4d on the hopper 4 so that by inserting a pin 4e through the apertures of the lugs 4c, 4d, the hopper 4 and top 4a are maintained in closed operative position. The dough is delivered from the secondary hoppers 5 and 6 through the gap between the rollers 7 and 8 into the dividing machine 13 or 14 as the case may be, or to any other desired portion of a plant for making bread.

The primary hoppers 1 are preferably made with a cylindrical top portion, an intermediate truncated conical portion leading to a smaller cylindrical bottom portion in which the discharge control valve 2 is located. It will be understood however, that the scope of our invention is not limited to the use of primary hoppers of the shape shown, but the invention can be applied to existing hoppers which are associated with, or follow, any dough proving plant.

The rollers 7 and 8 may, be revolved at different speeds for the purpose of regulating the discharge of dough from the secondary hoppers to the dividing machines, or equivalent.

We claim:—

1. Apparatus for transferring dough from dough proving plant to dough dividing plant, comprising, in combination, a primary hopper to which the dough passes from the proving plant, an inlet funnel fed from said primary hopper, an obliquely disposed outlet funnel, hinge means connecting said funnels with each other, and catch means for holding said funnels together detachably so as to form an articulated chute, secondary hopper means adapted to be fed from said chute, and means on said secondary hopper means for regulating the discharge of dough therefrom to the dough dividing plant.

2. Apparatus for transferring dough from dough proving plant to dough dividing plant comprising in combination a primary hopper to which the dough passes from the proving plant, a valve for regulating the discharge of dough from said primary hopper, an inlet funnel fed from said primary hopper, an obliquely disposed outlet funnel, a pivotal connection whereby said funnels are joined together so as to permit ready access to the adjoining interior parts thereof, fastener means for holding said funnels detachably in closed operative position so as normally to form an articulated chute, secondary hopper means adapted to be fed from said chute, and means on said secondary hopper means for regulating the discharge of dough therefrom to the dough dividing plant.

In testimony whereof we affix our signatures.

JAMES ELLIOTT WILSON.
SAMUEL McCONNELL.
CAMPBELL BROWN.